(12) United States Patent
Pedersen

(10) Patent No.: US 8,701,162 B1
(45) Date of Patent: Apr. 15, 2014

(54) METHOD AND SYSTEM FOR DETECTING AND COUNTERING MALWARE IN A COMPUTER

(75) Inventor: Richard N. Pedersen, Toms River, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 250 days.

(21) Appl. No.: 12/917,550

(22) Filed: Nov. 2, 2010

(51) Int. Cl.
*G06F 17/00* (2006.01)

(52) U.S. Cl.
USPC ............ 726/4; 709/242; 709/247; 726/3; 726/23; 726/24; 714/37; 713/154; 370/352

(58) Field of Classification Search
USPC ........... 726/22–26, 3; 709/242, 247; 713/154; 370/352
See application file for complete search history.

(56) References Cited

U.S. PATENT DOCUMENTS

| | | | |
|---|---|---|---|
| 5,359,659 A * | 10/1994 | Rosenthal | 726/24 |
| 2003/0033435 A1* | 2/2003 | Hanner | 709/247 |
| 2005/0060535 A1* | 3/2005 | Bartas | 713/154 |
| 2006/0242686 A1* | 10/2006 | Toda et al. | 726/3 |
| 2007/0239892 A1* | 10/2007 | Ott et al. | 709/242 |
| 2008/0141371 A1* | 6/2008 | Bradicich et al. | 726/23 |
| 2009/0323676 A1* | 12/2009 | Kuo | 370/352 |
| 2010/0002671 A1* | 1/2010 | Iwai et al. | 370/342 |
| 2010/0077482 A1* | 3/2010 | Adams | 726/24 |
| 2010/0180344 A1* | 7/2010 | Malyshev et al. | 726/23 |
| 2011/0029817 A1* | 2/2011 | Nakagawa et al. | 714/37 |

* cited by examiner

*Primary Examiner* — Beemnet Dada
*Assistant Examiner* — Sayed Beheshti Shirazi
(74) *Attorney, Agent, or Firm* — Howard IP Law Group, PC

(57) ABSTRACT

An arrangement analyzes a data stream to identify particular token sequences known to be of interest or malware. A preprocessing step organizes the malware tokens into a "graph" in which overlapping token sequences are interconnected with logic splices. The preprocessing is performed only once for a given set of malware targets. The resulting graph can be traversed quickly in runtime operation to identify malware token strings in the data stream.

18 Claims, 14 Drawing Sheets

MALWARE SIGNATURE TABLE

$S_1$:  003  3875249  • • •  Pattern 1

$S_2$:  002  9748562  • • •  Pattern 2

$S_3$:  003  4829687  • • •  Pattern 3

⋮

$S_k$:  003  4893276  • • •  Pattern 3a

⋮

$S_n$:  <u>999</u>  <u>1200339</u> • • •  Pattern 4
        Preamble  Body

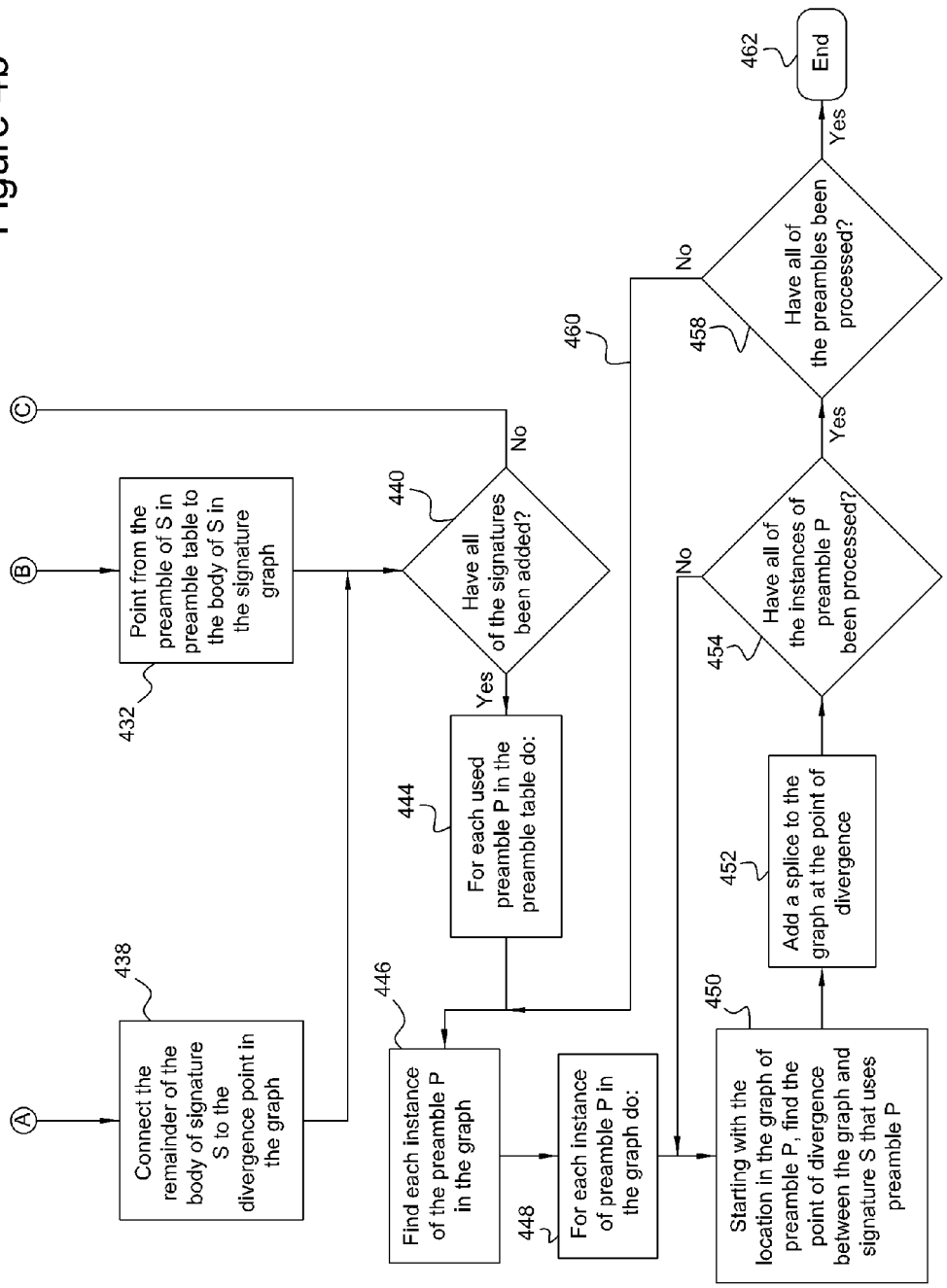

0009991200338875249...
800

METHOD AND SYSTEM FOR DETECTING AND COUNTERING MALWARE IN A COMPUTER

BACKGROUND

An undesirable consequence of the widespread use of computer networks, and particularly the Internet, is the spread of computer viruses and other malware. Conventional anti-malware identifies the presence of malware by comparing a stored or known "signature" or token string of identified malware with the data stream in which the malware is sought. In order to make this comparison, the data stream must be written into a memory of some sort, so that the time sequence of the tokens may be examined or compared with the stored signature. When the comparison of the data stream with the signatures identifies the presence of malware, steps can be taken to cure, ameliorate, or eliminate its presence. In general, merely knowing that malware is present is insufficient to allow the malware to be removed. It is also necessary to identify the specific type of malware so that predetermined action can be taken. The types of action to be taken against malware in general are well known, although new variants appear frequently.

FIG. 1 is a simplified block diagram of a computer including a processor 12, read-only memory (ROM) 14, random-access or dynamic memory (RAM) 16, hard drive 17, and network interface 18. During normal operation of the computer 10, computer signals flow by way of a bus illustrated as 20 among the processor 12, ROM 14, RAM 16, hard drive 17, and, if used, the network associated with interface 18. Malware can exist in RAM, ROM, the hard drive, and on the network. In order to detect the presence of malware, signals are allowed to flow on bus 20 to an identification algorithm 12id, which is illustrated as being a block within the processor 12. Those skilled in the art will understand that the identification algorithm 12id appears in processor 12 when loaded from a memory, generally from hard drive 17 or ROM 14. The identification algorithm 12id flags or triggers an amelioration algorithm illustrated as a block 12am when it senses the presence of malware, and amelioration algorithm 12am performs a predetermined set of actions in order to prevent the malware from reaching its intended destination, or to remove or quarantine the malware.

In the prior art, a data stream from ROM 14, RAM 16, hard drive 17, or network interface 18 passes through identification algorithm 12id of FIG. 1, and the tokens (bits, bytes, or multiple bytes) of the data stream are compared element-by-element with predetermined "templates" which are known to characterize the various forms of malware. When a match is found, the malware associated with the particular template is deemed to have been detected, and the amelioration algorithm is invoked against its presence.

Improved malware detection arrangements and countermeasures are desired.

SUMMARY

A method according to an aspect of the invention is for identifying the existence of malware in a data stream. The method comprises the step of acquiring a computer database of token strings, each of which is characteristic of particular malware, so that the computer database includes token strings of plural malware entities. The method further includes the step of, in a computer process, generating a graph from the database of token strings of plural malware entities, in which any token string of an entity of malware which overlaps at least in part a token string of an other malware entity is joined thereto by a logic splice. The method further comprises the step of, in a computer process, performing run-time processing by passing the data stream through at least a portion of the graph while comparing the token string of the data stream with the graph to thereby identify a token string characteristic of a malware entity and, if found, flagging the presence of malware. In a particular mode of the method, the further step is performed of, in conjunction with the step of generating a graph, associating with each the token string of malware an identification of the particular malware, and, in conjunction with the step of flagging the presence of malware, identifying the particular malware so flagged. Following the step of flagging, the step may be performed of taking action against the malware. The step of generating a graph may comprise the steps of (a) generating a preamble table including an entry for every possible preamble of a malware token stream and also including a plurality of pointers, (b) for each token string of a given malware, locating the preamble of the token string in the preamble table, (c) adding the body of the token string of the given malware to an element of a graph, and (d) selecting from among said plurality of pointers associated with the preamble that one identified by an index equal to the value of the token of the first token of the body of the token string of the given malware, and identifying the pointer from the preamble table of the given malware to the node containing the first token of the body of the token string of the given malware. The step of generating a graph may comprise the steps of (a) for each malware entity in which the token sequence partially overlaps the token sequence of an other malware entity to thereby establish a point of divergence, determining the point of divergence in the graph, and (b) at the point of divergence, interconnecting with a logic splice the token strings of the malware entity and the other malware entity. During said run-time processing, the method may traverse the logic splice in dependence upon the value of the next token of the data stream.

A method according to another aspect of the invention may comprise the steps of (a) acquiring a computer database of token strings, each of which token strings is characteristic of a particular malware, (b) in a computer process, preprocessing to generate a graph from the database of token strings of malware, in which graph token strings of a given malware which correspond to token strings of an other malware are joined by a logic splice, so that at least some malware token strings are joined to other token strings by a least one splice, (c) in a computer process, passing the data stream through a portion of the graph while comparing the token string of the data stream with the graph to thereby (i) identify a token string characteristic of the given malware and, if found, flagging the presence of the identified given malware, and (ii) if a token string characteristic of the other malware is identified, routing the data stream over the associated splice to a further portion of the graph to continue the comparing. In an advantageous mode of this method, the computer process may be responsive to the flagging of the given malware by taking action against the given malware.

A computer system according to another aspect of the disclosure comprises a processor executing instructions for identifying the existence of malware in a data stream. The instructions include generating a graph from a database of token strings of plural malware entities, in which any token string of an entity of malware which overlaps at least in part a token string of an other malware entity is joined thereto by a logic splice, performing run-time processing by passing said data stream through at least a portion of said graph while comparing the token string of the data stream with the graph to thereby identify a token string characteristic of a malware entity and, if found, flagging the presence of malware.

BRIEF DESCRIPTION OF THE DRAWINGS

FIG. 2 is a simplified table illustrating an example of a prior-art set of malware signatures or sequences of tokens characteristic of known malware;

DETAILED DESCRIPTION

FIG. 2 illustrates a prior-art table 200 listing tokens (bits, bytes, or sets of bytes) associated with or characteristic of various known or identified malware. In FIG. 2, the token patterns associated with various different malware signatures are identified as "Patterns." Thus, the first signature Pattern 1, also referred to herein as $S_1$, is set forth as including the token sequence 0033875249 . . . of a first malware signature, the second signature Pattern 2, referred to herein as $S_2$, is set forth as including token sequence 0029748562 . . . of a second malware signature, the third signature Pattern 3, referred to herein as $S_3$, is 0034829687 . . . , the fourth signature Pattern 3a, referred to herein as $S_k$, is 0034893276 . . . , and the last signature shown in FIG. 2, Pattern 4, referred to herein as $S_n$, is set forth as 9991200339 . . . . It will be understood that the actual number of tokens for each malware pattern may be very large. The prior-art method for comparison of the malware token patterns with the stream of data tokens under test or for consideration involves token-by-token comparison of the malware set with the tokens of the data stream. The speed at which such a prior-art "linear" comparison can be made involves the speed at which the computer can perform the comparison of each digit or token of each pattern against the data stream. The time required can be expressed as $N*M*C$, where N is the number of patterns, M is the number of tokens per pattern, and C is the length of time required to read the data stream. This time is proportional to the number of search patterns in the table of FIG. 2, and is often characterized as an $O(N^2)$ problem.

An aspect of the disclosure lies in a computer malware identification processing arrangement which performs the identification in constant time, based on the length of the "discovered" signature and not on the number of malware patterns being searched for. This is accomplished by preprocessing the signatures of the table of FIG. 2 to form a "signature graph" which links many or all of the malware signatures into a form which a computer run-time process can traverse quickly.

Figure 3:
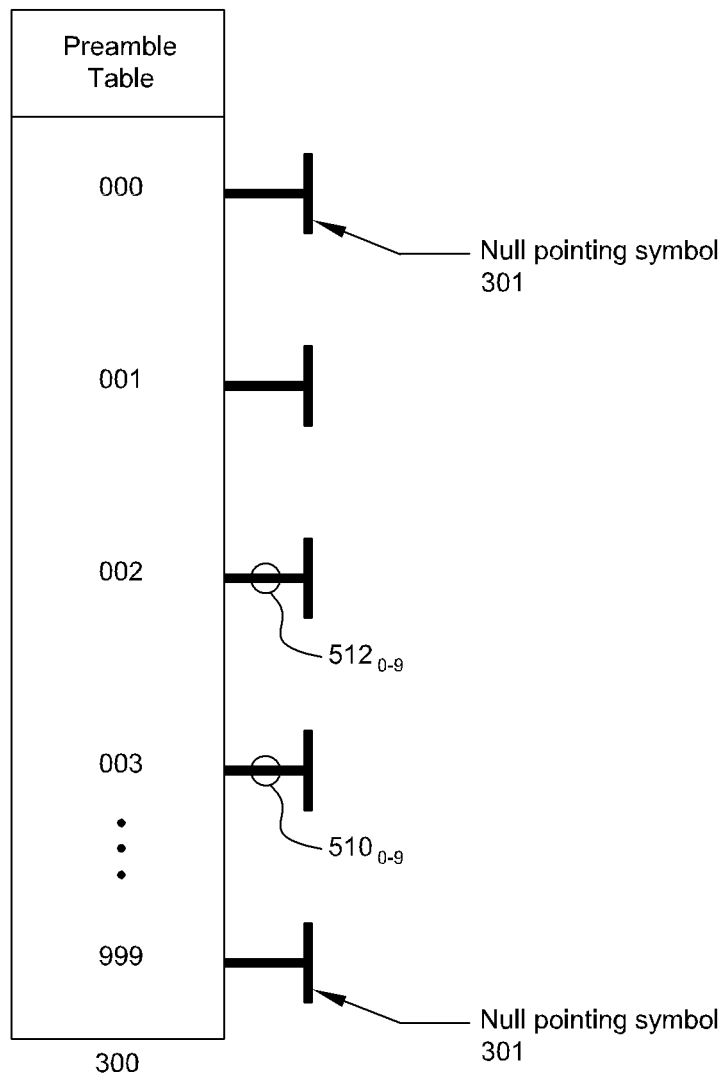
FIG. 3 illustrates a preamble table listing all possible preambles, from which all pointers are initially null.
Figure 4A:
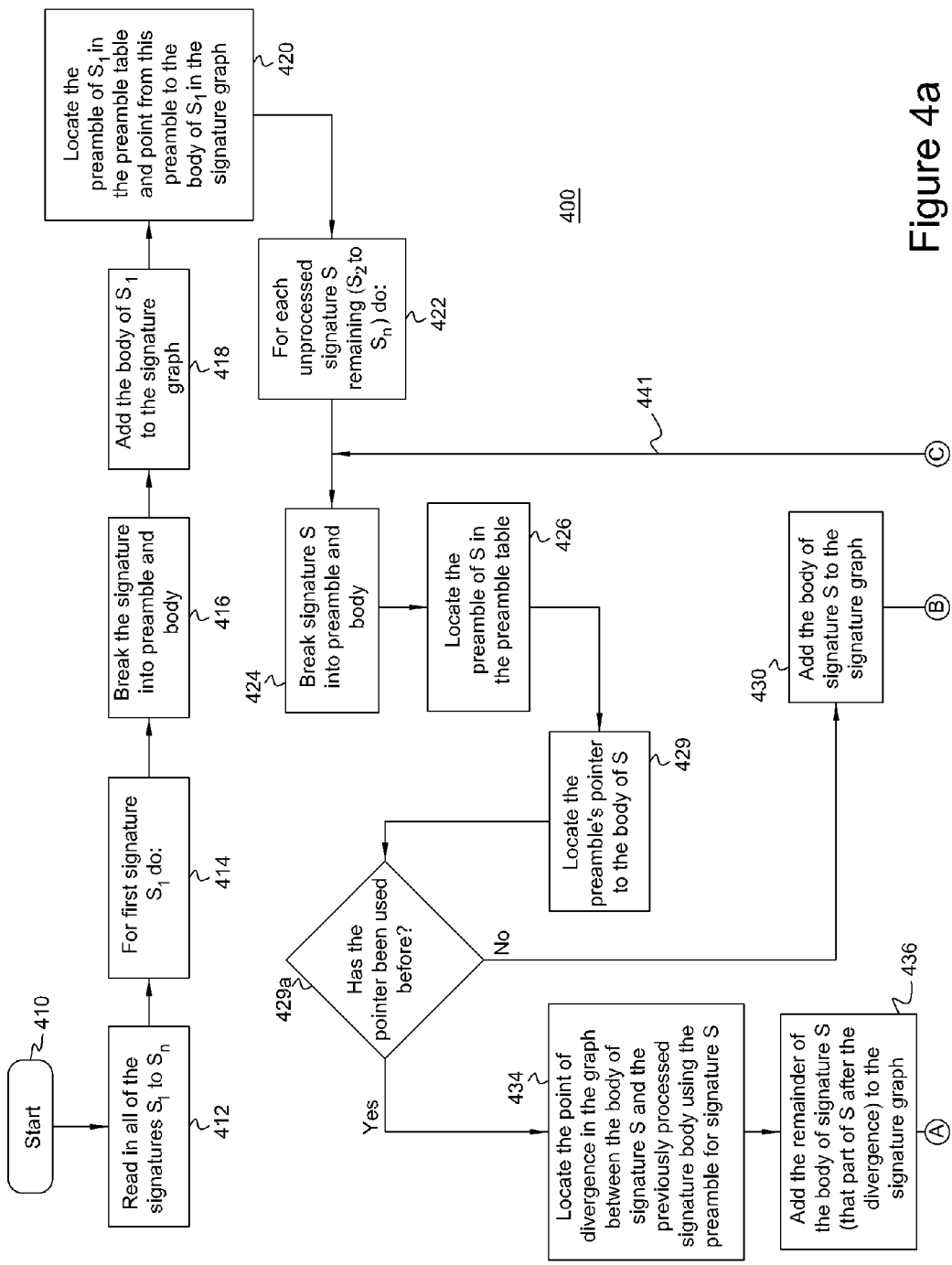
FIG. 4 is a simplified computer command or logic flow chart or diagram illustrating the computer "preprocessing" generation of a signature graph from a computer database of known malware signatures or token strings such as that of FIG. 2 with the aid of a preamble table such as that of FIG. 3.
Figure 7:
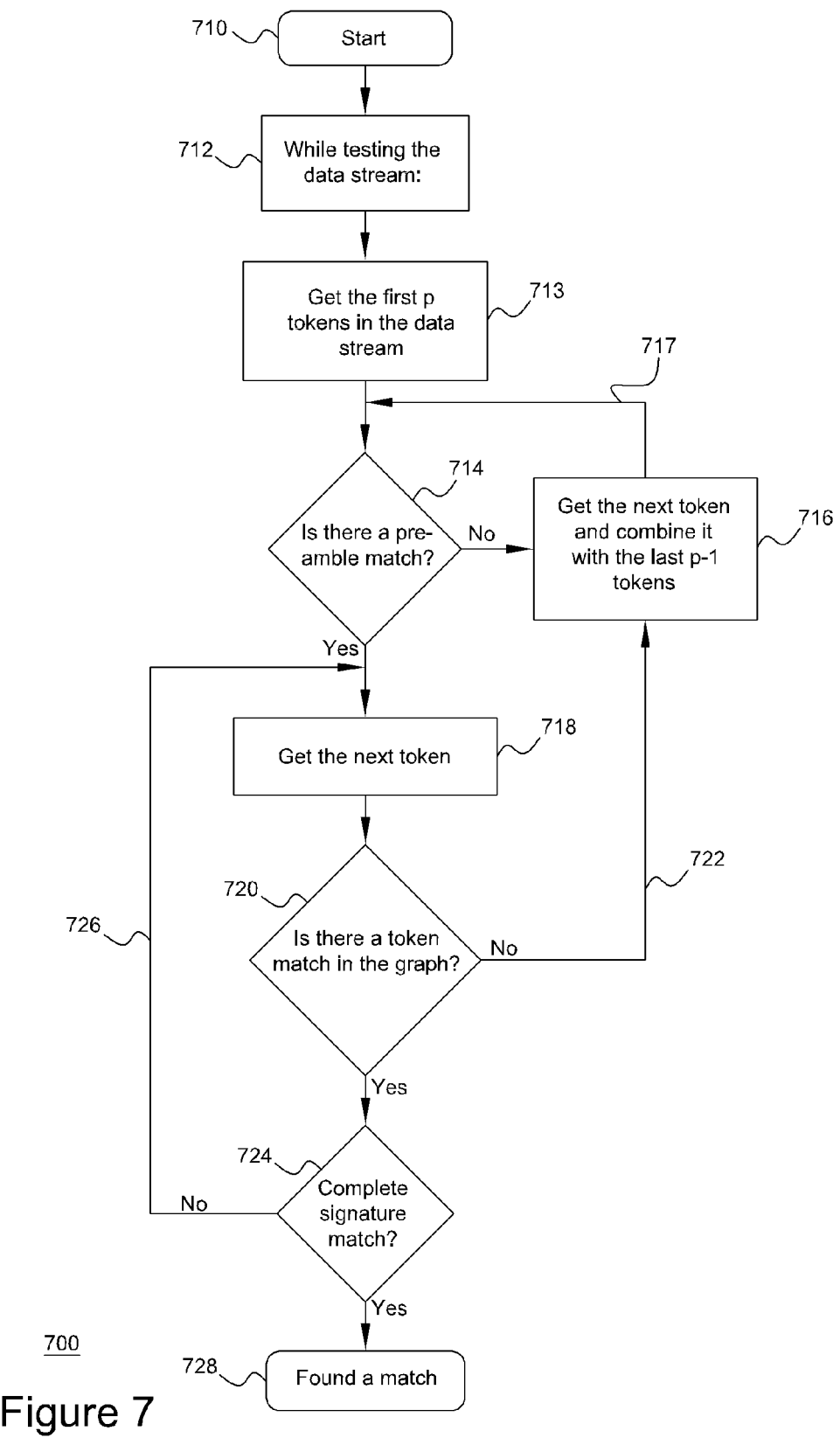
FIG. 7 is a simplified logic flow chart or diagram illustrating runtime processing of the graph generated by the preprocessing of FIG. 4.

The malware signatures are composed of tokens. Each token can have any one of "t" possible values. To simplify this description, the tokens used are decimal digits, where there are t=10 possible values for each token. Those skilled in the art will understand that tokens having a different number of possible values may also be used. This description breaks the malware signature pattern into two parts, namely a preamble portion (hereinafter "preamble") and a body portion (hereinafter "body"). The preamble consists of a fixed number of tokens from the beginning of the signature pattern, and the signature body has an indefinite length, depending upon the characteristics of the malware being sought. All possible preambles are contained in fixed locations within a preamble table. The signature body tokens representing the remainder of the malware signature that does not include the preamble are stored as needed (depending on which signature patterns are to be analyzed) in a data structure that links the signature tokens together. Each preamble entry includes a number of pointers that connect the preamble to the signature body, with the choice of the pointer being based on the value of the first token in the signature body. FIG. 3 is a simplified diagram illustrating a preamble table 300 three tokens wide. The preamble table contains all possible preambles. For a preamble of "p" tokens, the total number of elements in the preamble table is $t^p$. In the case of a 3-token table where each token can have t=10 possible values (0 through 9, inclusive), there will be $10^3$, or 1000 elements in the preamble table. The element values in table 300 of FIG. 3 extend from 000 through 001, 002, 003, . . . to 999. Each element in the preamble table has t pointers, each of which can point to a separate location in a signature graph (signature graph described below). Two pointer sets are illustrated in FIG. 3, which are designated $510_{0-9}$ and $512_{0-9}$. Each of these sets includes ten pointer paths. Pointer set $510_{0-9}$ is associated with 3-token preamble "003", and pointer set $512_{0-9}$ is associated with preamble "002". A specific one of these pointer paths will be selected during preprocessing, corresponding to the value of the next token following the preamble. For example, if the next token in a signature after preamble 510 has the value "7", this selects pointer $510_7$ (or equivalently $510_{N=7}$) from among the ten pointers of set $510_{0-9}$. The action of locating one of these pointers consists of identifying the value of the next token following the preamble, and then using that pointer as a location index to identify which of the t pointers for that preamble is desired. The action of assigning a value to a preamble pointer is to fill that pointer with the address in the signature graph that contains the next token in the signature following the token used to select the preamble table pointer. Each element 1 through N of the preamble table 300 of FIG. 3 initially has null pointing targets for each pointer, illustrated by a null pointing symbol 301. In the preamble table of FIG. 3, the preambles are assumed to be three (3) tokens long for ease of explanation, but any length may be selected. The preamble table is not amended during preprocessing, but pointers are added from some of its elements, as described below. The signature graph consists of nodes for each token represented in the signature graph. Each node in the signature graph has t pointers, each of which can point to a separate location in a signature graph. A specific one of these pointer paths will be selected during preprocessing, corresponding to the value of the next token following the current token. The preprocessing of FIG. 4 is used to build the preamble table and signature graph. The runtime processing of FIG. 7 is used to traverse the resulting preamble table and signature graph by selecting the appropriate pointers based on the values of successive tokens in the data stream analyzed at runtime.

FIG. 4 is a simplified computer command or logic flow chart or diagram 400 illustrating computer preprocessing for generation of a signature graph from a computer database 200 of known malware signatures or token strings such as that of FIG. 2. In FIG. 4, the logic 400 begins at a START block 410 and flows to a block 412. Block 412 represents the reading of the various patterns or token strings of the known malware signatures $S_1$ to $S_n$ from the computer database 200 of FIG. 2. The term "token string" may be understood as being, for example, a bit or byte string. In FIG. 2, database 200 is illustrated as including portions of five signatures or token string patterns characteristic of, or representing, malware. The included portion of Pattern 1 is the token sequence "0033875249 . . . " of signature $S_1$, Pattern 2 is the token sequence "0029748562 . . . " of signature $S_2$, Pattern 3 is the token sequence "0034829687 . . . " of signature $S_3$, Pattern 3a is the token sequence "0034893276 . . . " of signature $S_5$, and Pattern 4 is the token sequence "9991200339 . . . " of signature $S_4$.

The logic 400 of FIG. 4 begins at a START block 410, and flows to a block 412, as mentioned above. From block 412 of FIG. 4, the logic 400 flows to a block 414. Block 414 represents the beginning of the preprocessing of the first signature $S_1$ of the table of FIG. 2 in sequence. The preprocessing performed by logic 400 of FIG. 4 can be in pattern numerical order or sequence; thus, preprocessing may begin with the signature $S_1$ of Pattern 1 of FIG. 2 and can proceed through the malware signatures associated with Patterns 2, 3, . . . , 3a . . . , 4 . . . to include the Pattern number identifying the last malware signature. During the first iteration through the logic 400, the first signature, namely $S_1$, is processed. From block 414, the logic 400 flows to a block 416. Block 416 represents the identification of the preamble and body portion of malware signature $S_1$ from the table of FIG. 2, and the separation of the preamble from the body of the signature. In the example, the preamble or preamble portion is selected to be the first three tokens of the malware signature, and the body or body portion is the entirety of the malware signature without its preamble. In the malware signature table of FIG. 2, the preamble is identified as being or including the first N tokens, where N is taken as being three (3) for purposes of explanation. From block 416, the logic 400 of FIG. 4 flows to a block 418. Block 418 represents the addition of the body of the malware signature currently being processed to a signature graph. The signature graph is illustrated as the dash outline 500 of FIG. 5A.

Figure 5A:
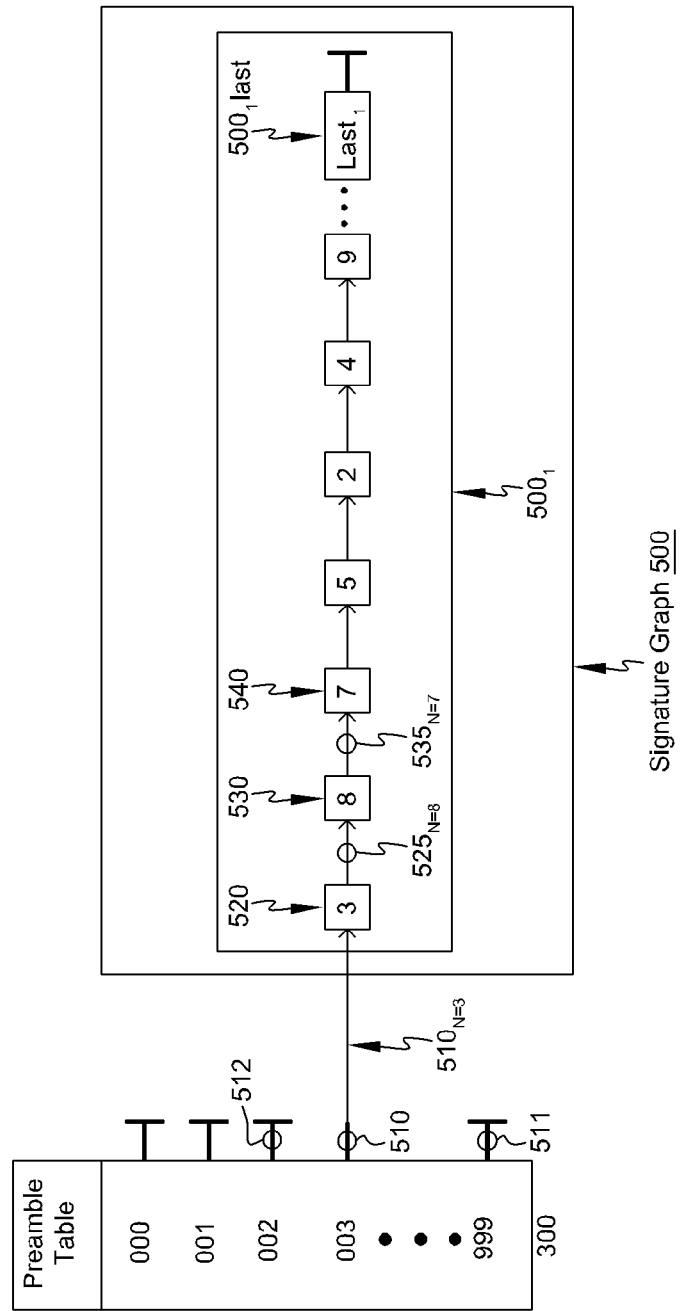
FIGS. 5A, 5B, 5C, 5D, and 5E and 5F together represent a sequence of representations of the signature graph built by the computer program of FIG. 4 as additional signatures are added to the graph.

The action of block 418 of FIG. 4, namely addition of the body of the first malware signature to the signature graph 500 of FIG. 5A, is represented in FIG. 5A by the addition of the body sequence designated $500_1$. Sequence $500_1$ is the body sequence "3875249 . . . " of Pattern 1 of FIG. 2. The FIG. 400 processing of Pattern 1 illustrates the introduction of the first signature into the preamble table 300 and the signature graph 500. The body sequence is added to signature graph 500 in the following manner. A new node is added to the signature graph for each token in the signature body. As with the entries in the preamble table, each node has a set of t pointers. When the first node 520 of FIG. 5A of the signature body for Pattern 1 is added to the signature graph, the appropriate pointer from the preamble table 300, namely $510_{N=3}$, is set to point at node 520, based on the value N of the token, which is 3. Next, node 530 is created for the second token in the Pattern 1 signature body, which has the value 8. This node is then connected to node 520 in the signature body by assigning pointer $525_{N=8}$ to point at node 530. Next, node 540 is created for the third token in the Pattern 1 signature body, which has the value 7. This node is then connected to node 530 in the signature body by assigning pointer $535_{N=7}$ to point at node 540. This process continues until all of the tokens from the signature body have been added to the signature graph 500, to thereby define first signature body $500_1$. At the node $500_1$last representing the last token in the signature body, all of the pointers are set to null to indicate that this is the end of the signature body within the graph. In FIG. 5A, the pointers of last node $500_1$last are set to null. The "last" nodes also contain a signature number attribute that is used to indicate the signature number that is terminated in the graph by that node. In general, when signature $S_k$ is being added to the signature graph, the signature number attribute in the node $500_k$last is assigned the value "k". In the specific case when signature $S_1$ is being added to the signature graph, the signature number attribute in the node $500_1$last is assigned the value "1". This completes the tasks associated with logic block 418 of FIG. 4 for the signature currently being evaluated.

From block 418 of FIG. 4, the logic 400 flows to a block 420. Block 420 represents the searching for or the location of, in the preamble table 300 of FIG. 3, the preamble of the malware signature currently being processed (signature $S_1$ during the first iteration, having Pattern 1 preamble "003"), and the pointing from the preamble value (003) in the preamble table 300 to the associated malware body signature. The signature preamble of the first malware signature (Pattern 1) is "003." In FIG. 5A, the pointing is represented by an arrow of type $510_N$ extending from 003 in the preamble table 300 to malware body pattern $500_1$ in the signature graph 500 where the first token in the signature body has a value of "N." Specifically, pointer $510_{N=3}$ of type 510 is used to point from the preamble table to the signature body $500_1$. Pointer $510_{N=3}$ is used for this purpose in the case of FIG. 5A because the first token in the signature body is a token with the value "3." From block 420 of FIG. 4, the logic 400 flows to a block 422, representing the adjustment and processing of running indices of the computer process for the purpose of causing recursion of the logic processing 400 so as to implicate in sequence each remaining signature S of the table of FIG. 2, which are signatures $S_2$ through $S_n$.

Figure 5B:
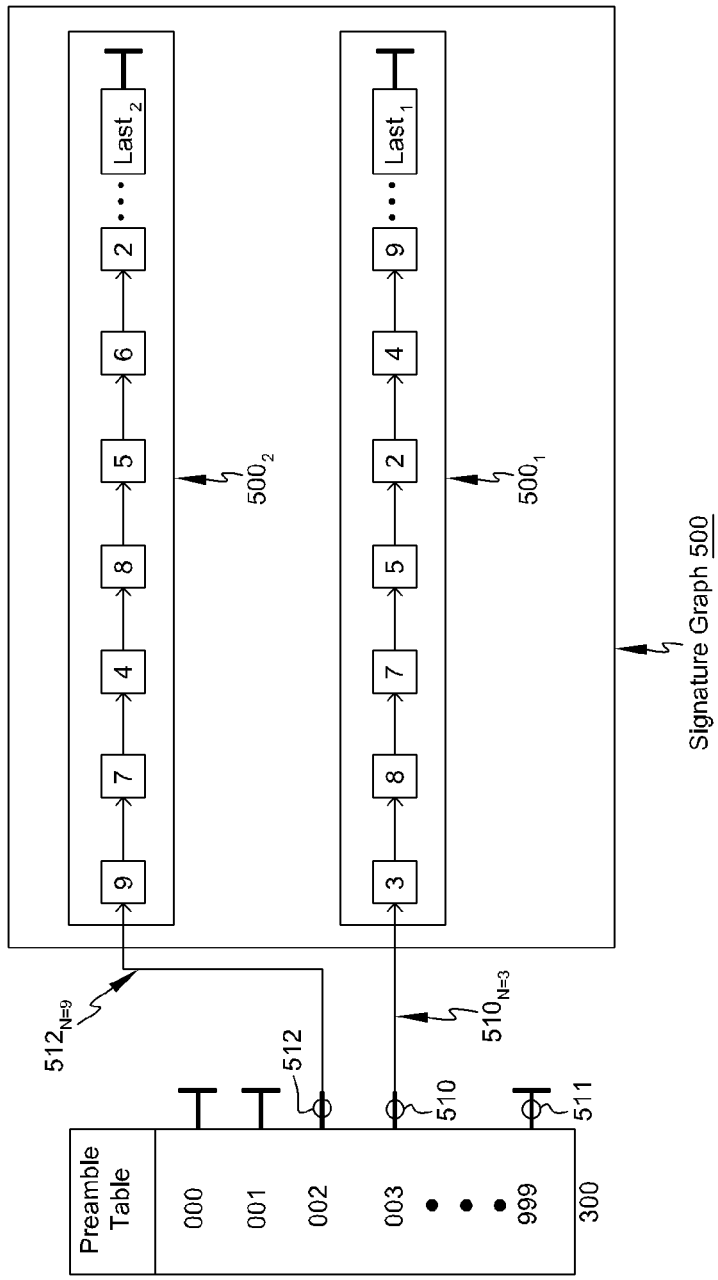

From block 422 of FIG. 4, the logic 400 flows to a block 424, which, for each further signature, represents breaking the signature into preamble and body portions, as described in conjunction with block 416. During the second iteration through the logic 400 of FIG. 4, the malware signature $S_2$ is Pattern 2, set forth in FIG. 2 as "0029748562 . . . " The FIG. 400 processing of Pattern 2 illustrates the introduction of an additional signature into the preamble table 300 and the signature graph 500 where there is no overlap of the newly-added pattern with any existing patterns already added to the preamble table and the signature graph. The preamble of the malware signature of Pattern 2 is "002." From block 424 of FIG. 4, the logic 400 flows to a block 426 that determines the location or identification in the preamble table of the corresponding preamble, which in this case is "002". From block 426, the logic 400 flows to a block 429 that determines the location or identification in the preamble table 300 of the preamble pointer that should be used to connect the preamble "002" to the signature body. Decision block 429a examines the preamble table to see if the preamble pointer of the current signature $S_2$ Pattern 2 has been previously used. This is readily accomplished by examining the pointer associated with the current preamble "002". If a pointer is already associated with the preamble in question, it is already "in use" for this purpose, as indicated by the fact that it is not a null pointer, but rather it points to a valid location within the signature graph. At the beginning of the processing of the second malware Pattern 2 using logic 400, the current state of the preamble table and signature graph is illustrated in FIG. 5A, and the state of the preamble table and signature graph after the completion of processing Pattern 2 is shown in FIG. 5B. The $S_2$ preamble currently being processed has the value "002" and the first token in the signature body has the value "9"; therefore, decision block 429a will examine pointer "9" associated with preamble "002". Examination of the ten pointers associated with preamble value "002" of the current state of the signature graph 500 illustrated in FIG. 5A reveals that it is or they are all null, so the preamble "002" has not previously been used, and in particular the pointer $512_{N=9}$ has not previously been used. Under this condition, the logic leaves decision block 429a of logic 400 by the NO output, and flows to a block 430. Block 430 represents the addition to the signature graph 500 of the body portion of the current malware signature. In the case of this second iteration, the body portion of the malware signature of Pattern 02 is "9748562...," represented in FIG. 5B as body portion $500_2$. From block 430 of FIG. 4, the logic 400 flows to a block 432. Block 432 represents the addition of a pointer $512_{N=9}$ extending from the preamble "002" to the malware body signature $500_2$ of Pattern 02, namely to the sequence "9748562 . . . " FIG. 5B illustrates the state of the signature graph 500 after the addition of the body Pattern 2, designated $500_2$, and addition of a pointer designated $512_{N=9}$ extending from preamble 002 to body pattern $500_2$.

Figure 5C:
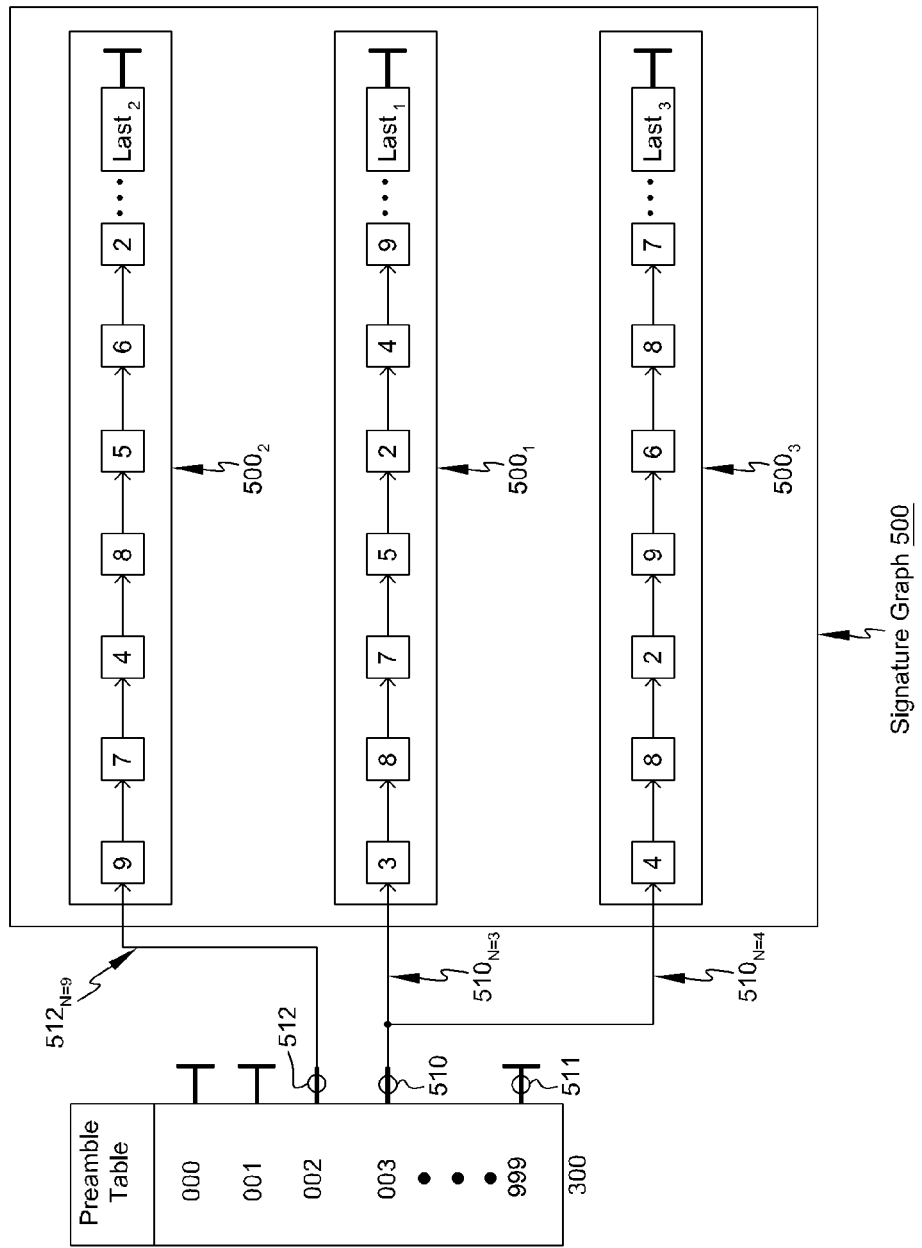

Continuing the explanation of the logic 400 of FIG. 4 during a later, or possibly the next following iteration of the logic 400 of FIG. 4, the malware signature $S_3$ currently being evaluated may be that of Pattern 3 of FIG. 2, namely the pattern "0034829687 . . . " The FIG. 400 processing of Pattern 3 illustrates the introduction of an additional signature into the preamble table 300 and the signature graph 500 where the preamble of the newly-added pattern is equal to the preamble of an existing pattern already existing in the preamble table and the signature graph. In this case, use will be made of a previously-unused preamble table pointer, $510_{N=4}$ for a previously-used preamble value "003." At the beginning of the processing of malware Pattern 3 using logic 400, the current state of the preamble table and signature graph is illustrated in FIG. 5B, and the state of the preamble table and signature graph after the completion of processing signature $S_3$ is shown in FIG. 5C. During the logic flow through blocks 424 and 426 of FIG. 4, the preamble "003" of Pattern 3 is separated from the body portion "4829687 . . . " The logic 400 arrives at a block 429, which locates the previously-created-but-unassigned or as-yet-unused pointer $510_{N=4}$ that the preamble "003" would use to point to the body of current signature $S_3$ whose first token value is "4". From block 429, the logic 400 arrives at decision block 429a, which is used to determine whether this as-yet-unused pointer $510_{N=4}$ has been previously used, by virtue of whether it has a null value. In the case of preprocessing of Pattern 3, as-yet-unused pointer $510_{N=4}$ has not previously been used, so decision block 429a routes the logic 400 to its NO output. From the NO output of decision block 429a, the logic 400 arrives at block 430. Block 430 represents the addition of the body portion "4829687 . . . " of Pattern 3 to a portion or element $500_3$ of signature graph 500 as illustrated in FIG. 5C. Block 432 of logic 400 represents the assignment of pointer $510_{N=4}$ extending from preamble "003" to the first node of element $500_3$ of signature graph 500. The state of the signature graph 500 at the end of the preprocessing of malware Pattern 3 is illustrated by FIG. 5C.

Figure 5D:
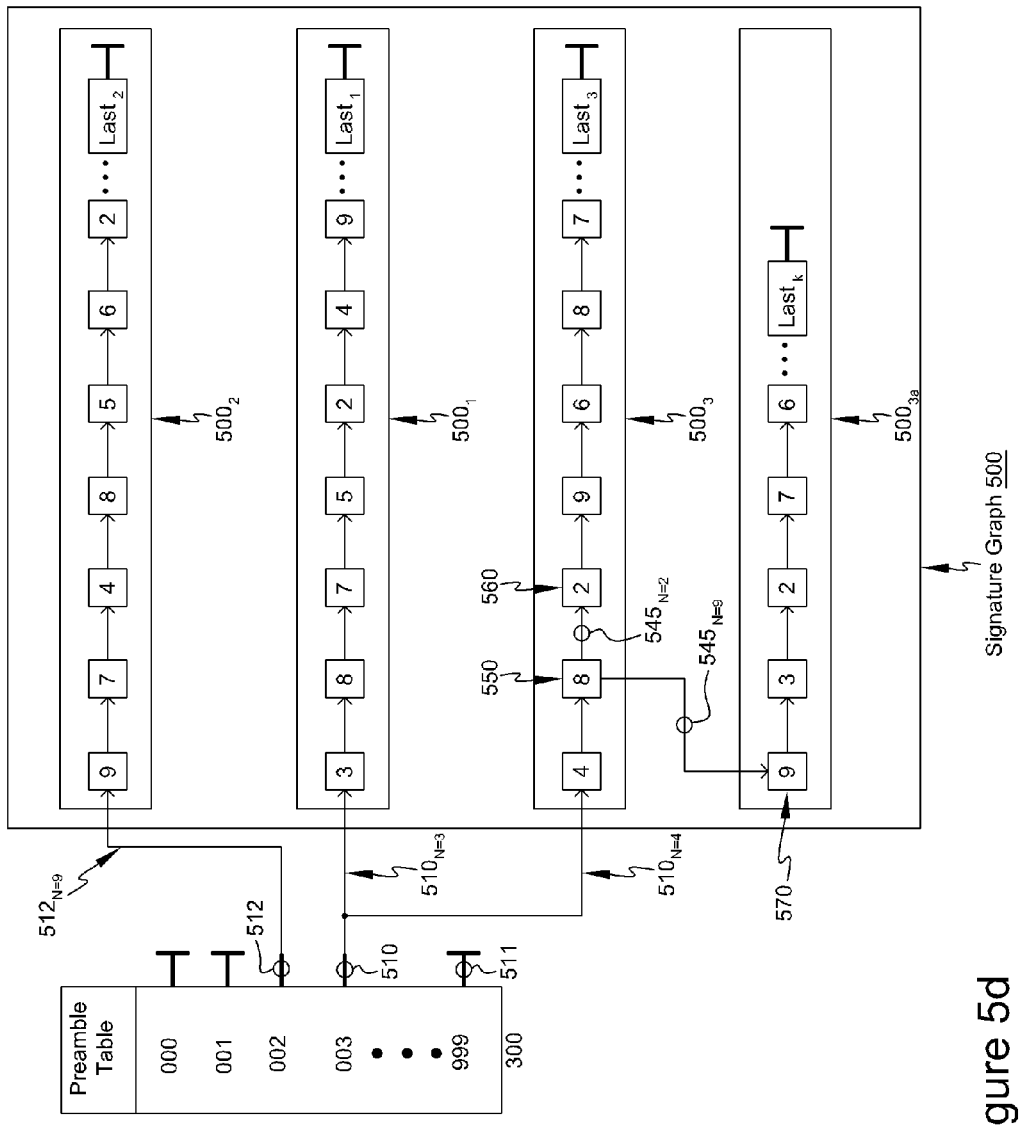

Eventually, preprocessing will begin on malware signature $S_k$, which may be Pattern 3a, using the logic 400 of FIG. 4. Malware pattern 3a is "0034893276 . . . " The FIG. 400 processing of Pattern 3a illustrates the introduction of an additional signature into the preamble table 300 and the signature graph 500 where the preamble and the initial portion of the signature body of the newly-added pattern is or are equal to the preamble and the initial portion of the signature body of an existing pattern already added to the preamble table and the signature graph. Malware pattern 3a is "0034893276 . . . ," and malware pattern 3 is "0034829687 . . . " In this case, the signature graph 500 of the two patterns diverges at node 550 in FIG. 5D, which is the last point in the signature graph where the two patterns have a common representation. FIG. 5C illustrates the state of the preamble table and signature graph when the processing of malware pattern 3a begins, and the state of the preamble table and signature graph after the completion of processing malware pattern 3a is shown in FIG. 5D. The logic 400 will proceed through block 424, which separates the preamble "003" from the body "4893276 . . . " of pattern 3a. Block 426 will locate the appropriate preamble "003" in the preamble table 300. Block 429 identifies or selects the pointer for the first token of the signature body of Pattern 3a, which has a value of "4", from preamble "003," which will be pointer $510_{N=4}$. In the case of evaluation of Pattern 3a, at the time the logic 400 of FIG. 4 reaches decision block 429a, the determination as to whether the pointer has already been used is found to be affirmative, and the logic 400 leaves decision block 429a by the YES output and arrives at block 434. Block 434 represents location or identification of the point of divergence between the body portion "4829687 . . . " of the malware signature body of Pattern 3 and the body portion "4893276 . . . " of the malware signature of Pattern 3a currently being processed. The location of the point of divergence during preprocessing is performed in block 434 by a token-by-token comparison of the body sequence of Pattern 3 ("4829687 . . . ") with the body sequence of Pattern 3a ("4893276 . . . ").

To recapitulate the steps involving addition to the preamble table 330 and the signature graph 500 of malware pattern 3a, as we start to add Pattern 3a to the graph, we realize that a) its preamble has already been used, b) its pointer $510_{N=4}$ has already been used, and c) initial tokens 4 & 8 have already been used. In other words, the first five tokens of Patterns 3 & 3a are identical. Both patterns therefore follow the same path through the preamble table and the signature graph until, finally, they diverge when we reach the sixth tokens. The preprocessing therefore makes no changes to the preamble table or the signature graph until that point is reached.

Figures 6, 8:
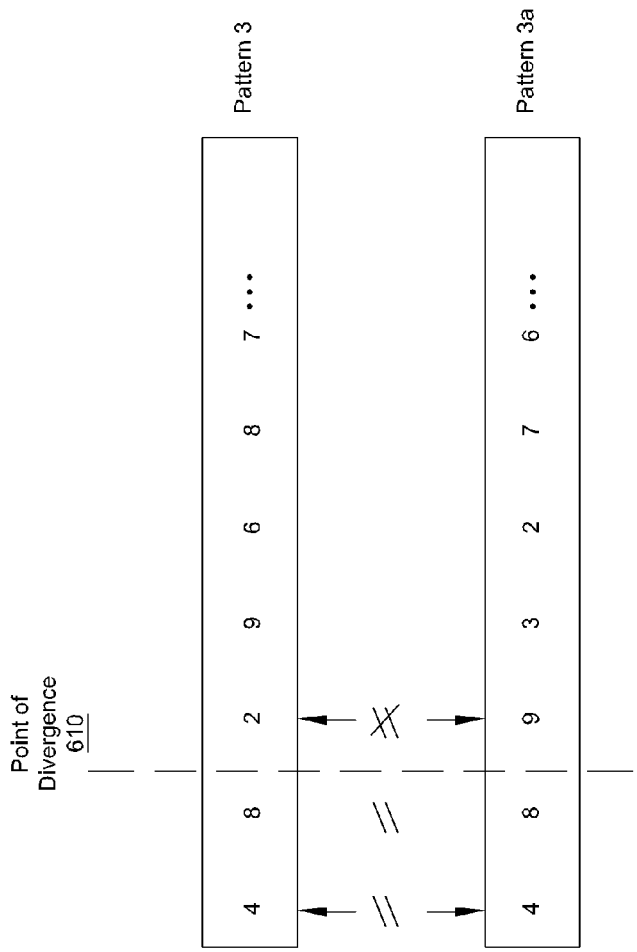
FIG. 6 is a representation of a comparison of tokens of body portions of malware signatures for determination of a point of divergence in FIG. 4A.
FIG. 8 sets forth the tokens of a partial data stream selected to illustrate the paths through the signature graph of FIG. 5F.

The location of the point of divergence is performed in block 434 by a token-by-token comparison of the body sequence of Pattern 3 ("4829687 . . . ") with the body sequence of Pattern 3a ("4893276 . . . "). FIG. 6 illustrates the comparison of the body portion "4829687 . . . " of the malware signature body of Pattern 3 and the body portion "4893276 . . . " of the malware signature of Pattern 3a. In FIG. 6, the matching tokens "4" and "8" are indicated by equal signs (=) and the first non-matching tokens of the two signatures (2 and 9) are illustrated by a not-equal sign (≠). The divergence is found by block 434 to be between two and three tokens into the respective body portions of Patterns 3 and 3a, namely at the internodal space lying between "48" and "29687 . . . " of Pattern 3 and at the internodal space lying between "48" and "93276 . . . " of Pattern 3a. The point of divergence is illustrated in FIG. 6 by a dash line. This point of divergence (that is, the dash line 610) corresponds to the internodal spaces lying between nodes 550 and 560, and between nodes 550 and 570 in FIG. 5D.

As with the preamble table, each node in the signature graph 500 contains "t" pointers, each of which is capable of being directed to a separate point in the signature graph. As in the case of the preamble table pointers, the value of the next token at which the pointer is directed in the signature body (in this case the next token following the point of divergence) determines which pointer to use. There are two tokens following the points of divergence of FIG. 6, namely the token "9" of the body portion of Pattern 3a, and the token "2" of the body portion of Pattern 3. In the case of Pattern 3a, the signature pointer must also be pointed depending on the value "9" of the next token following the point of divergence. Block 436 of FIG. 4 adds the remainder of the body of Pattern 3a (93276 . . . ) to the signature graph as element $500_{3a}$, illustrated in FIG. 5D. Block 438 sets the appropriate pointer(s), including pointer 545, in (or from) the divergence found in block 434 to point at remainder of the body of Pattern 03a added to the graph in block 436. Pointer $545_{N=2}$ in FIG. 5D was previously used to connect signature node 550 to signature node 560 in signature body $500_3$, and pointer $545_{N=9}$ is used to connect signature node 550 in signature body $500_3$ to signature node 570 in signature body $500_{3a}$. In the signature graph 500 of FIG. 5d, there are two assigned pointers at the node for token "8" in the body portion "48 . . . " Pointer $545_{N=2}$ will point to the remainder of signature body "29687 . . . " from Pattern 3, and pointer $545_{N=9}$ will point to the remainder of signature body "93276 . . . " from Pattern 3a. FIG. 5D illustrates the signature graph 500 after the addition of body portion $500_3$a and pointers $545_{N=2}$ and $545_{N=9}$. At this point in the processing of logic 400 of FIG. 4, the logic flows from block 438 to a decision block 440, which decides if all of the signatures have been added.

Figure 5E:
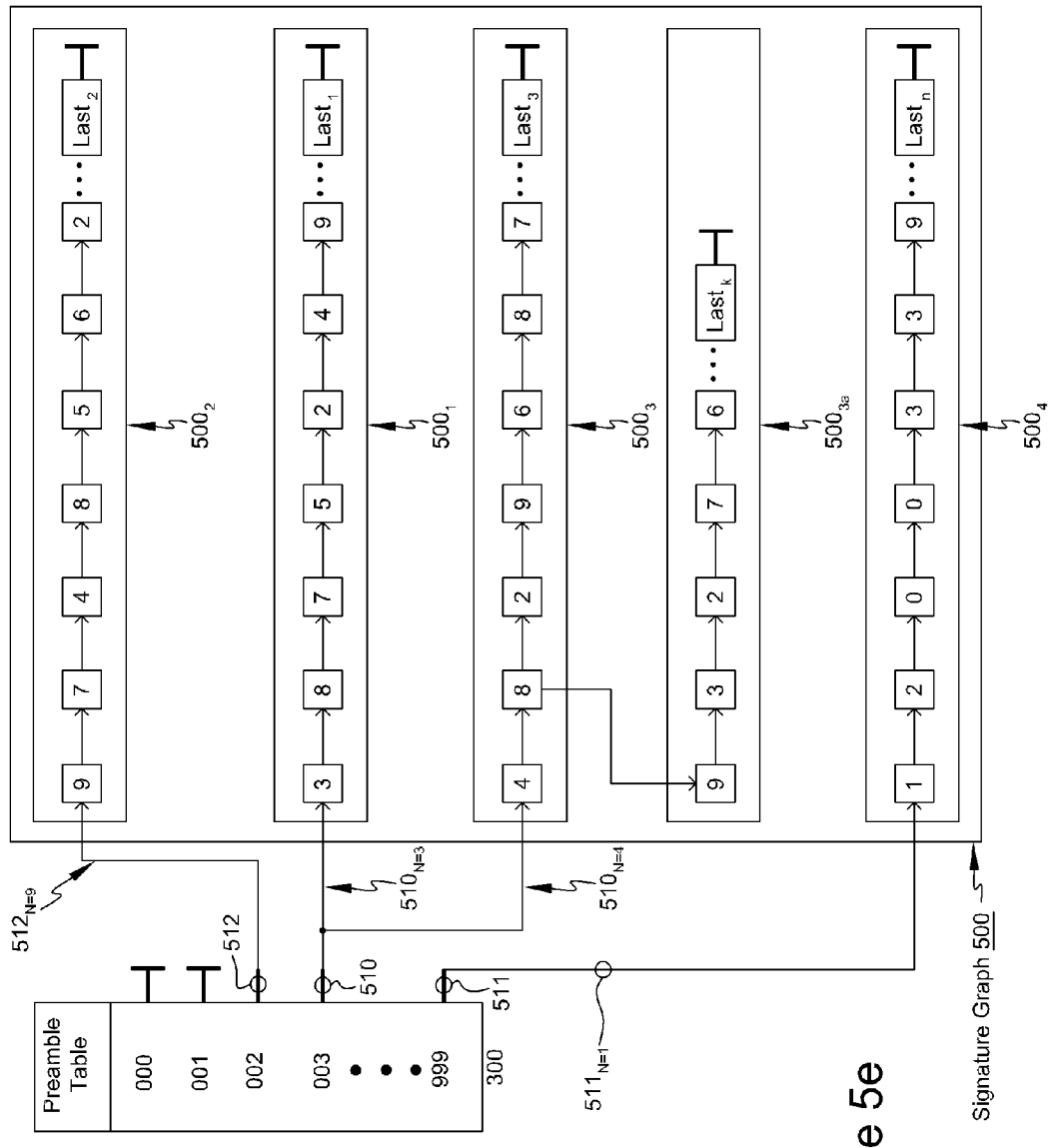

The addition of Patterns 1, 2, 3, and 3a ($S_1$, $S_2$, $S_3$, and $S_k$, respectively) to the preamble table 300 and to the signature graph 500 by logic 400 has been described, resulting in the signature graph of FIG. 5D. For purposes of explanation of the preprocessing performed by logic 400, it is assumed that one additional Pattern, namely Pattern 4 of FIG. 2 ($S_n$), must still be added to the signature graph 500. The addition of Pattern 4 to the preamble table and signature graph by the logic 400 is used to illustrate the operation of blocks 450 and 452 of logic 400, for the case in which a preamble and a portion of the initial signature body from one pattern is imbedded in the signature body of another pattern. As described below, the preamble "003" and the initial body token "3" of the signature of Pattern 1 are imbedded in Pattern 4, and more particularly Pattern 4 includes the tokens "99912 00339 . . . , of which the tokens "0033" appear in Pattern 1. The state of the preamble table 300 and signature graph 500 at the beginning of this iteration through logic 400 is illustrated in FIG. 5D, and the state of the preamble table 300 and signature graph 500 after the completion of processing signature $S_n$ is shown in FIG. 5E. In this last iteration, the logic 400 leaves decision block 440 by the NO output, and proceeds by way of a logic path 441 back to block 424. Logic block 424 breaks Pattern 4 into a 3-token preamble portion "999" and a body portion "1200339 . . . " Block 426 locates the preamble "999" in the preamble table 300 of FIG. 3. Block 429 represents locating the pointer of the set 511 of pointers associated with preamble "999," which points to next token value "1." The pointer from preamble "999" of Pattern 4 to the body of Pattern 4 is therefore $511_{N=1}$, as illustrated in FIG. 5E. Decision block 429a finds that this pointer has not previously been used, so the logic 400 leaves decision block 429a by the No output, and flows to block 430. Block 430 represents addition to the signature graph 500 of the body portion of the currently processed signature, namely body portion "1200339 . . . " of Pattern 4. Block 432 represents the pointing of pointer $511_{N=1}$ from preamble "999" to the body portion "1200339 . . . " The addition of body portion "1200339 . . . " of Pattern 4 to the signature graph 500 as $500_4$, and the pointing thereto by pointer $511_1$, is illustrated in FIG. 5E. From block 432 of FIG. 4, logic 400 flows to decision block 440. This time, decision block 440 finds that all the signatures have been added, and the logic leaves by the YES output. The next block of the logic of FIG. 4 is block 444, which in conjunction with blocks 446 and 448 manipulates the running indices and variables to iteratively execute the remaining preprocessing logic.

Figure 5F:
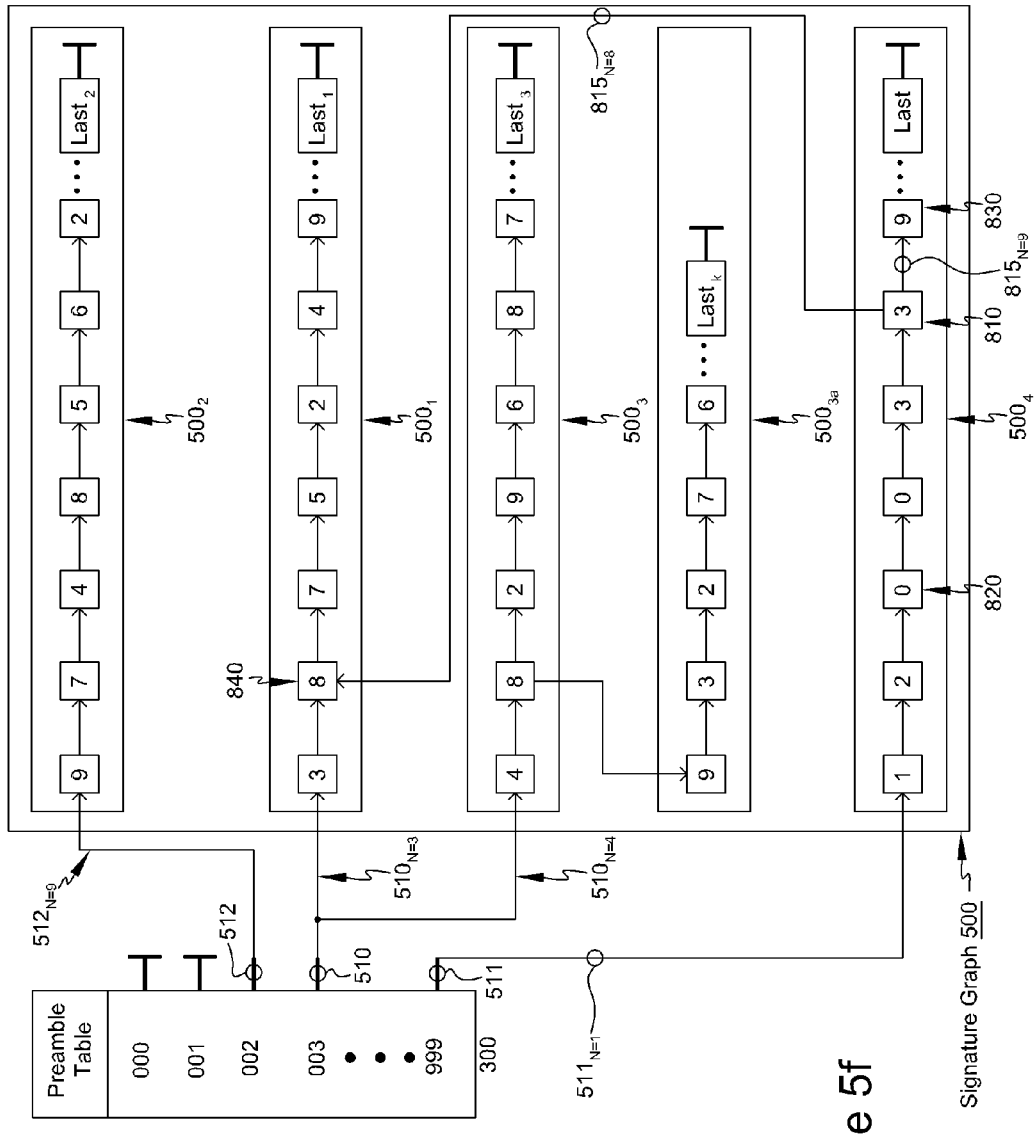

From blocks 444 and 446 of FIG. 4, logic 400 flows to a block 448. Block 448 represents the searching of the signature graph for each preamble, and location of the point of divergence between the bodies of the signatures which use the same preamble. Block 452 represents adding a splice, bridge or connection between the points of divergence. The splice is added using a new pointer assignment that connects different signature bodies within the signature graph. This processing is illustrated in FIG. 5F, where the preamble value "003" is located in signature body $500_4$ beginning at node 820. Processing block 450 then locates the divergence at node 810. Pointer $815_{N=9}$ was previously used to connect node 810 to node 830 in signature body $500_4$. Processing block 452 of FIG. 4 now uses pointer $815_{N=8}$ to create a splice in the signature graph that connects node 810 in signature body $500_4$ to node 840 in signature body $500_1$. Once all the preamble signatures have been processed by adding all of the necessary splices at the points of divergence, logic blocks 454, 456, and 458 represent the ending of the preprocessing.

The preprocessing described in conjunction with FIGS. 2, 3, 4, 5A through 5F, and 6 is performed only once so long as the set of malware signatures remains constant. Consequently, the preprocessing can be performed "off-line." This preprocessing is "linear," in that a full search of the signature tokens is performed. Once the preprocessing is completed, the actual runtime algorithm can be used to rapidly compare a stream of data with the preprocessed information.

Figure 1:
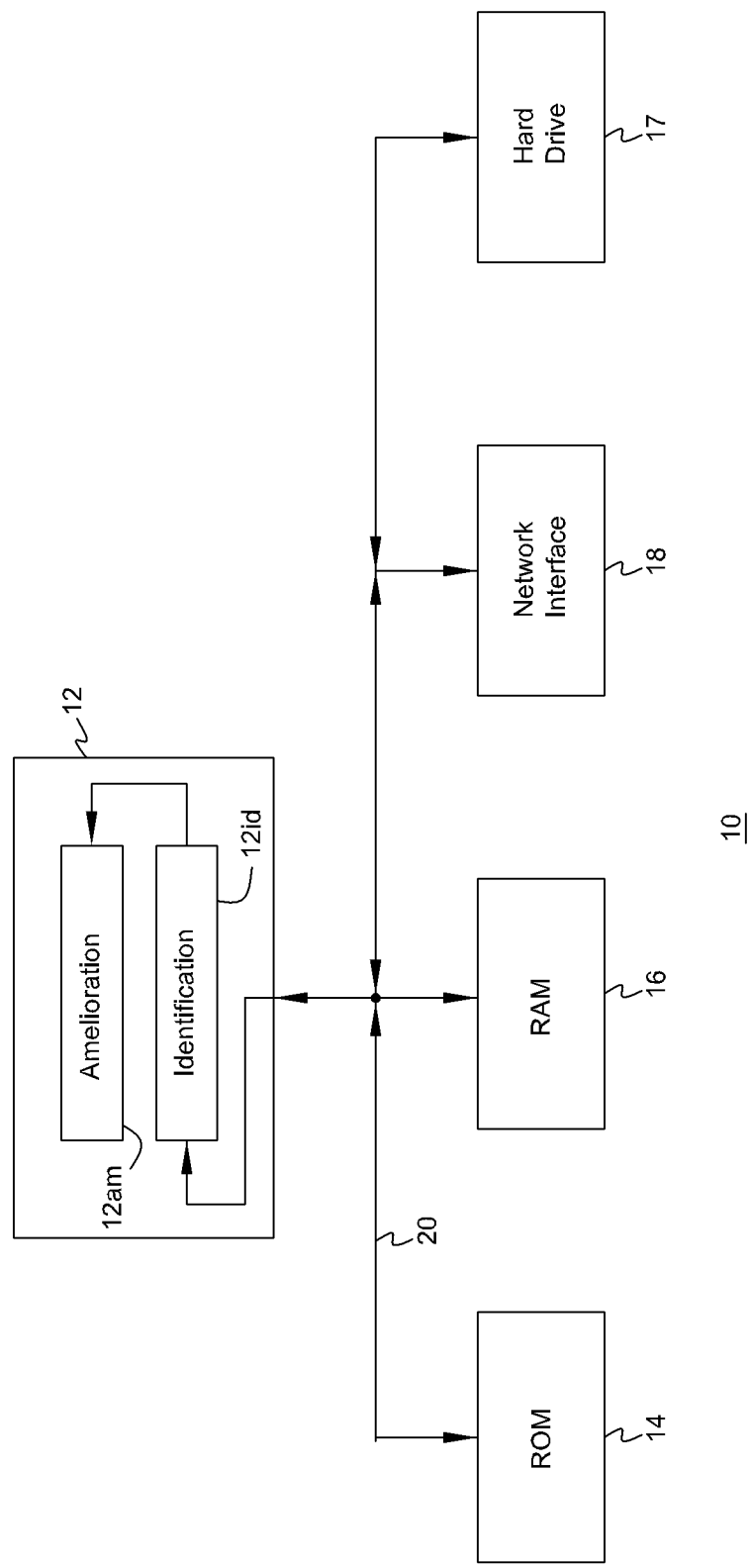
FIG. 1 is a simplified block diagram of a prior-art computer arrangement with a malware identification process and an amelioration process which acts in response to identification of particular malware.

FIG. 7 is a simplified logic flow chart or diagram illustrating the runtime processing for performing a rapid comparison between the tokens of a data stream and the known token patterns of malware in the preamble table and the completed signature graph. In FIG. 7, the logic starts at a START block 710 and flows to a block 712, which represents the start of the runtime processing and its continuation as long as the data stream is being tested. From block 712, the logic 700 flows to block 713, which assembles "p" consecutive tokens from the data stream, where p is the number of tokens represented in the preamble table, namely three in the example. From block 713, the logic 700 flows to a decision block 714, which determines if there is a match of the current p tokens of the data stream to any of the of the active preambles in the preamble table. Recall that an "active" preamble is one containing at least one pointer that has been assigned during preprocessing to point at a signature body node in the signature graph 500. Recall also that a preamble contains "p" successive tokens, and that the preamble table contains a total of $t^p$ possible preamble values in the table. If there is not a match, the logic leaves decision block 714 by the NO output, and flows to a block 716. Block 716 represents assembly of the current token along with the previous p–1 tokens from the data stream to create a value to use to locate the appropriate entry in the preamble table. In the example used to illustrate the operation of the pre-processing portion of the design, t=10, and p=3, resulting in a preamble table with 1000 locations. Continuing the use of these parameters to illustrate the operation of the runtime portion of the design, block 716 combines the current token from the data stream with the two previous tokens to form a three-token preamble. This three-token preamble is then used to access a location in the preamble table. Block 714 determines whether there is a match by checking the t pointers for the selected entry of the preamble table, with a match being declared if any of the pointers for that entry have been assigned to point to a signature body in the signature graph. As mentioned, if there is not a match in the preamble table, the logic leaves decision block 714 by the NO output, and flows to block 716 and a logic path 717 back to decision block 714 to use the next token of the data stream along with the previous p−1 tokens to repeat the process of checking for a preamble match. When there is a match, the logic leaves decision block 714 by the YES output, and flows to a block 718. The runtime processing also uses the matched pointers to commence a traversal of the nodes in the signature graph, using techniques known to those skilled in the art of data graph traversal. Block 718 represents observing the next token in the data stream. From block 718, the logic flows to a decision block 720, which determines if there is a match of each remaining token of the data stream to the body of the malware signature associated with the preamble. If the value of the next token does not match an active pointer at each node of the signature graph, the processing flows from the no path 722 of block 720 to block 716, where it resumes the preamble match processing. Until a complete signature has been matched, decision block 724 routes the logic by its NO output and by way of a logic path 726 back to block 718, and the logic iterates continually. In the event that decision block 724 finds a complete match to the body of a malware signature, the logic is routed by way of the YES output to a block 728. The logic determines that a complete match has been found when it encounters a last node in the signature graph, which has the general form 500$_k$last. Block 728 represents the identification of a match. The arrival of the logic at identification block 728 may be used to trigger the amelioration portion 12$am$ of FIG. 1. The logic can determine which amelioration technique to use by retrieving the signature number from the encountered last node, so that the logic has specified which specific signature has been detected.

Figure 5G:
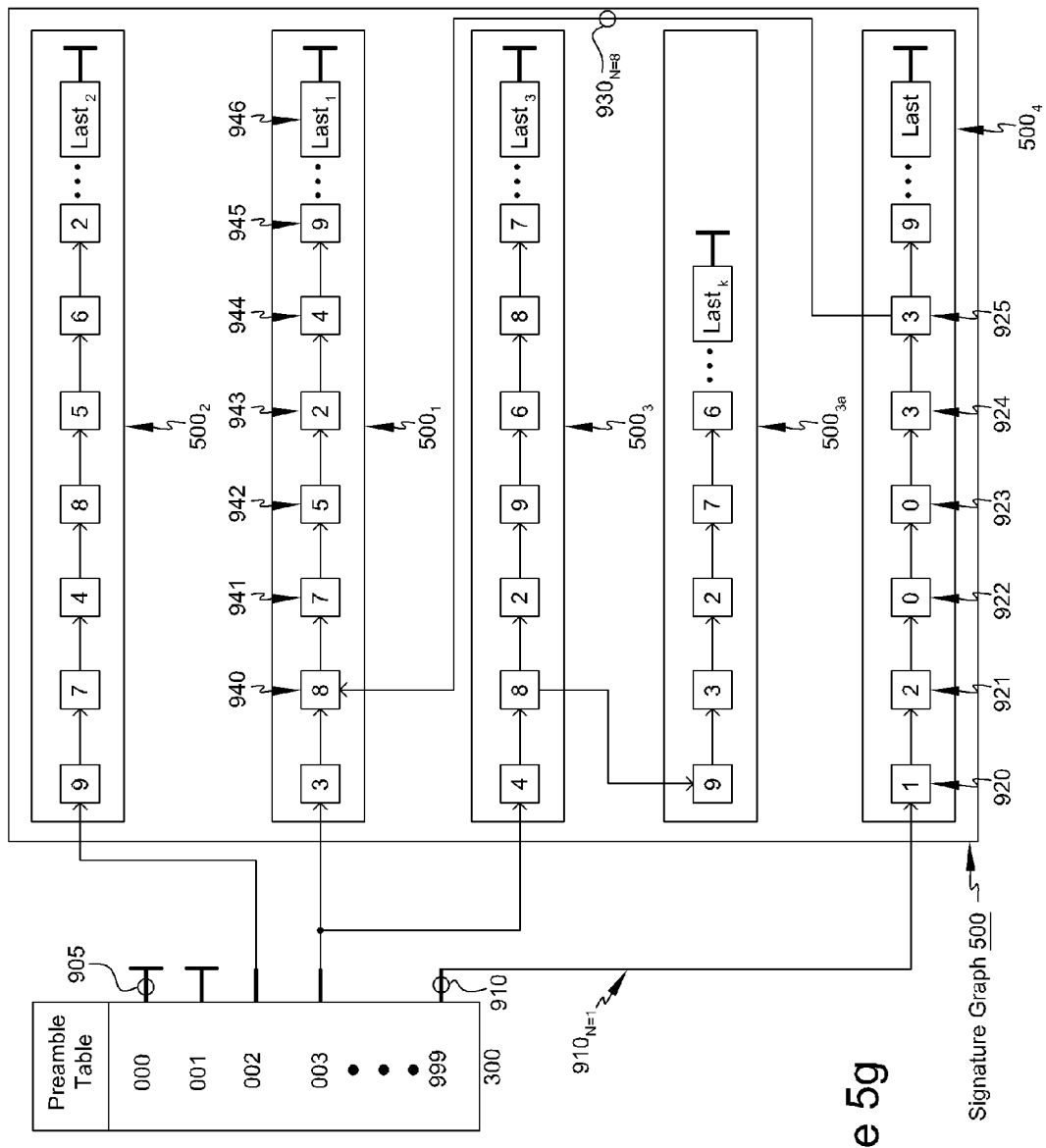
FIG. 5G is similar to FIG. 5F, but includes information about the path taken during run-time processing of the signature graph with the data stream of FIG. 8.

As an example of the run-time processing through the logic 700 of FIG. 7, assume that the data tokens are as set forth in FIG. 8, namely the token sequence "000999120033875249 . . . " applied to the signature graph of FIG. 5G. Initially, the data stream is applied to the logic 700, and flows through blocks 710, 712, and 713. In block 713, which assembles the first "p" tokens from the data stream, the first three tokens "000" are collected then sent on to decision block 714, since in the case of this example "p" has the value three. Decision block 714 notes that there is no preamble match, since the preamble pointers 905 for preamble 000 of preamble table 300 are all null. This causes the logic 700 to follow the NO output from decision block 714 to block 716. Block 716 continues to select new tokens from the data stream, and following path 717 applies them to decision block 714 until a preamble match is found. This match occurs after tokens "000999" have been processed. At this point, the logic "resides" at the output pointers 910 of preamble 999 of the preamble table 300 of FIG. 5G, but no particular one of the pointers has been selected. The logic flows from the YES output of decision block 714 to block 718, representing acquisition of the next data token, which is "1." From block 718, the logic flows to decision block 720, where a match for the current token "1" is sought in the 910 pointers. Decision block 720 determines that signature graph pointer corresponding to the current token "1," which is 910$_{N=1}$, is not null, and it uses this pointer to continue its analysis of the data stream within the signature graph, with the signature graph pointer pointing to node 920 in the signature graph. Leaving decision block 720 by the YES output the logic flows to decision block 724, which determines that a match has not been found because the current pointer does not point to a LAST node in the signature graph. The logic therefore leaves decision block 724 by its NO output and travels to block 718 by path 726. The logic then cycles through blocks 720, 724, and 718 by processing the following tokens causing the pointer to move to the following nodes in the signature graph. The processing of data stream token "2" of data token set 800 causes the signature graph pointer to advance to point at node 921. The processing of the next data stream token "0" then causes the signature graph pointer to advance to point at node 922. The processing of the next data stream token "0" then causes the signature graph pointer to advance to point at node 923. The processing of the next data stream token "3" then causes the signature graph pointer to advance to point at node 924. The processing of the next data stream token "3" then causes the signature graph pointer to advance to point at node 925. The processing of data stream token "8" of token set 800 then causes the signature graph pointer to follow divergence path 930$_{N=8}$ and thereby advance to point at node 940. It can be seen that the logic would also have arrived at node 940 if a data stream with the initial token sequence "00338" had been applied to the logic starting at block 712. The processing continues with data stream token "7" causing the signature graph pointer to advance to point at node 941. The processing of data stream token "5" then causes the signature graph pointer to advance to point at node 942. The processing of data stream token "2" the causes the signature graph pointer to advance to point at node 943. The processing of data stream token "4" the causes the signature graph pointer to advance to point at node 944. The processing of data stream token "9" then causes the signature graph pointer to advance to point at node 945. In this example, the processing of data stream notionally continues to follow the sequence of tokens in signature body 500$_1$, ultimately causing the signature graph pointer to advance to point at the Last$_1$ node 946 of signature body 500$_1$. When this point is reached, decision block 724 concludes that a complete signature match has been encountered, and that the data stream contains signature S$_1$ corresponding to Pattern 1. The logic then leaves decision block 724 by the YES output and advances to block 728, where a match with signature S$_1$ is declared. At this point, an amelioration routine specific to signature S$_1$ can be used to mitigate any consequences of its inclusion in the data stream.

Thus, the disclosure employs a specialized "preamble table" and "signature graph" data structure to represent the malware pattern database, where the signature graph is an arrangement of data items and connections therebetween. Splices are inserted into the signature graph during preprocessing, at locations at which the initial pattern sequences overlap. The preprocessing uses linear search to determine the splice locations. During runtime, the algorithm "traverses" the graph as it examines or compares the input data stream. Only a single traversal of the graph is necessary to find any pattern in the database.

During runtime processing, when the logic follows a string of matching tokens, the splices inserted into the signature graph enable matching to continue without interruption even when a second signature is embedded within the first signature that initiated the signature graph traversal from the preamble table. At the point where the two signatures diverge due to a difference in values of the next token in each signature, the runtime processing will follow the path from the divergence of the signature whose pointer matches the value of the next token in the data stream. The signature graph can work with all possible numbers of signature graph divergences since each node in the signature graph contains t pointers, one for each possible value of the next token.

Other embodiments of a token sequence detector will be apparent to those skilled in the art. For example, a token representing any possible value can be inserted into a token node when preprocessing to generate the signature graph. Thus, a grouping of particular tokens separated by a given number of nodes of arbitrary token value from another grouping of particular tokens can be identified. While the data being compared with the signature graph has been described as a "data stream," the data stream may originate from either within or without a given computer, and could take the form of a particular sequence or series of computer instructions or communications messages.

A method according to an aspect of the invention is for identifying the existence of malware in a data stream (800). The method comprises the step of acquiring a computer database (200) of token strings, each of which is characteristic of particular malware, so that the computer database includes token strings of plural malware entities. The method further includes the step of, in a computer process (10), generating (400) a graph (500) from the database (200) of token strings of plural malware entities, in which any token string of an entity of malware which overlaps at least in part a token string of an other malware entity is joined thereto by a logic splice (such as 545$_{N=9}$). The method further comprises the step of, in a computer process (10), performing run-time processing (700) by passing the data stream (800) through at least a portion of the graph (500) while comparing the token string of the data stream (800) with the graph (500) to thereby identify a token string characteristic of a malware entity and, if found, flagging (728) the presence of malware. In a particular mode of the method, the further step is performed of, in conjunction with the step of generating a graph, associating with each the token string of malware an identification of the particular malware, and, in conjunction with the step of flagging the presence of malware, identifying the particular malware so flagged. Following the step of flagging, the step may be performed of taking action (12*am*) against the malware. The step of generating a graph may comprise the steps of (a) generating a preamble table including an entry for every possible preamble of a malware token stream and also including a plurality of pointers, (b) for each token string of a given malware, locating (420) the preamble of the token string in the preamble table (300), (c) adding (418) the body of the token string of the given malware to an element of a graph, and (d) selecting from among said plurality of pointers associated with the preamble that one identified by an index equal to the value of the token of the first token of the body of the token string of the given malware, and identifying the pointer from the preamble table of the given malware to the node containing the first token (520) of the body of the token string of the given malware. The step of generating a graph may comprise the steps of (a) for each malware entity in which the token sequence partially overlaps the token sequence of an other malware entity to thereby establish a point of divergence, determining the point of divergence in the graph, and (b) at the point of divergence, interconnecting with a logic splice the token strings of the malware entity and the other malware entity. During said run-time processing, the method may traverse the logic splice in dependence upon the value of the next token of the data stream.

A method according to another aspect of the invention may comprise the steps of (a) acquiring a computer database of token strings, each of which token strings is characteristic of a particular malware, (b) in a computer process, preprocessing to generate a graph from the database of token strings of malware, in which graph token strings of a given malware which correspond to token strings of an other malware are joined by a logic splice, so that at least some malware token strings are joined to other token strings by a least one splice, (c) in a computer process, passing the data stream through a portion of the graph while comparing the token string of the data stream with the graph to thereby (i) identify a token string characteristic of the given malware and, if found, flagging the presence of the identified given malware, and (ii) if a token string characteristic of the other malware is identified, routing the data stream over the associated splice to a further portion of the graph to continue the comparing. In an advantageous mode of this method, the computer process may be responsive to the flagging of the given malware by taking action against the given malware.

What is claimed is:

1. A method for identifying the existence of malware in a data stream, said method comprising the steps of:

acquiring a computer database of token strings, each of which is a string of bits or bytes that is characteristic of a string of bits or bytes of a particular malware that may be in the data stream, so that said computer database includes token strings of plural malware entities;

generating, using a hardware processor, a graph from said database of token strings of plural malware entities, in which any token string of an entity of malware which overlaps at least in part a token string of another malware entity is joined thereto by a logic splice; and performing run-time processing by passing said data stream through at least a portion of said graph while comparing the token string of the data stream with the graph to thereby identify a token string of bits or bytes characteristic of bits or bytes of a malware entity that is in the data stream and, when found, flagging the presence of malware;

wherein generating said graph from said database of token strings of plural malware entities comprises creating a table of preamble entries, each preamble entry being associated with a plurality of pointers, wherein each of the plurality of pointers corresponds to a unique value of a data token, and setting at least one pointer of the plurality of pointers to a node containing a token value that corresponds to the at least one pointer.

2. A method according to claim 1, further comprising the steps of:

in conjunction with said step of generating a graph, associating with each said token string of malware an identification of the particular malware; and in conjunction with said step of flagging the presence of malware, identifying the particular malware so flagged.

3. A method according to claim 1, further comprising, following said step of flagging taking action against said malware.

4. A method for identifying the existence of malware in a data stream, said method comprising the steps of:

acquiring a computer database of token strings, each of which is characteristic of particular malware, wherein said computer database includes token strings of plural malware entities;

generating, using a hardware processor, a graph from said database of token strings of plural malware entities, in which any token string of an entity of malware which overlaps at least in part a token string of another malware entity is joined thereto by a logic splice; and performing run-time processing by passing said data stream through at least a portion of said graph while comparing the token string of the data stream with the graph to thereby identify a token string characteristic of a malware entity and, when found, flagging the presence of malware;

wherein said step of generating a graph comprises the steps of:

generating a preamble table including an entry for every possible preamble of a malware token stream;

for each token string of a given malware, locating the preamble of said token string in said preamble table;

adding the body of said token string of said given malware to an element of a graph; and selecting from among a plurality of pointers associated with said preamble a pointer storing a location of an element of said graph containing the first token of said body of said token string of said given malware, wherein the selected pointer has an index equal to a value of the first token of said body.

5. A method according to claim 1, wherein said step of generating a graph comprises the steps of:

for each malware entity in which the token sequence partially overlaps the token sequence of another malware entity establishing a point of divergence, determining the point of divergence in said graph; and at said point of divergence, interconnecting with a logic splice the token strings of said malware entity and said other malware entity.

6. A method according to claim 5, wherein during said run-time processing, further comprising the step of traversing said logic splice in dependence upon the value of the next token of said data stream.

7. A method for identifying the existence of malware in a data stream, said method comprising the steps of:

acquiring a computer database of token strings, each of which token strings is a string of bits or bytes that is characteristic of a string of bits or bytes of a particular malware that may be in the data stream;

preprocessing to generate a graph from said database of token strings of malware, in which graph token strings of a given malware which correspond to token strings of another malware are joined by a logic splice, wherein at least some malware token strings are joined to other token strings by at least one splice;

performing, using a hardware processor, run-time processing by passing said data stream through at least a portion of said graph while comparing the token string of the data stream with the graph to identify a token string of bits or bytes characteristic of bits or bytes of a malware entity that is in the data stream; and responsive to the flagging of said given malware entity, taking action against said given malware entity;

wherein generating said graph from said database of token strings of malware comprises creating a table of preamble entries, each preamble entry being associated with a plurality of pointers, wherein each of the plurality of pointers corresponds to a unique value of a data token, and setting at least one pointer of the plurality of pointers to a node containing a token value that corresponds to the at least one pointer.

8. A computer system comprising:

a hardware processor executing instructions for identifying the existence of a string of bits or bytes that is characteristic of bits or bytes of a malware that is in a data stream, the instructions including:

generating a graph from a database of token strings of plural malware entities, in which any token string of an entity of malware which overlaps at least in part a token string of another malware entity is joined thereto by a logic splice; and performing run-time processing by passing said data stream through at least a portion of said graph while comparing the token string of the data stream with the graph to thereby identify a token string of bits or bytes characteristic of bits or bytes of a malware entity that is in the data stream and, when found, flagging the presence of malware;

wherein generating said graph from said database of token strings of plural malware entities comprises creating a table of preamble entries, each preamble entry being associated with a plurality of pointers, wherein each of the plurality of pointers corresponds to a unique value of a data token, and setting at least one pointer of the plurality of pointers to a node containing a token value that corresponds to the at least one pointer.

9. A computer system according to claim 8, wherein the instructions for identifying the existence of malware in a data stream further includes instructions for:

in conjunction with said instruction for generating a graph, associating with each said token string of malware an identification of the particular malware; and in conjunction with said instruction for flagging the presence of malware, identifying the particular malware so flagged.

10. A computer system according to claim 8, wherein following said instruction for flagging, further including instructions for taking action against said malware.

11. A computer system comprising:

a hardware processor executing instructions for identifying the existence of malware in a data stream, the instructions including:

generating a graph from a database of token strings of plural malware entities, in which any token string of an entity of malware which overlaps at least in part a token string of another malware entity is joined thereto by a logic splice; and performing run-time processing by passing said data stream through at least a portion of said graph while comparing the token string of the data stream with the graph to thereby identify a token string characteristic of a malware entity and, when found, flagging the presence of malware;

wherein said instruction for generating a graph includes instructions for:

generating a preamble table including an entry for every possible preamble of a malware token stream;

for each token string of a given malware, locating the preamble of said token string in said preamble table;

adding the body of said token string of said given malware to an element of a graph;

selecting from among a plurality of pointers associated with said preamble a pointer storing a location of a node of said graph containing the first token of said body of said token string of said given malware, wherein the selected pointer has an index equal to a value of the first token of said body.

12. A computer system according to claim 8, wherein said instruction for generating a graph further includes instructions for:
  for each malware entity in which the token sequence partially overlaps the token sequence of an other malware entity to thereby establish a point of divergence, determining the point of divergence in said graph; and
  at said point of divergence, interconnecting with a logic splice the token strings of said malware entity and said other malware entity.

13. A computer system according to claim 12, wherein during said run-time processing, further including instructions for traversing said logic splice in dependence upon the value of the next token of said data stream.

14. A method for identifying the existence of a string of bits or bytes that is characteristic of bits or bytes of a particular malware in a data stream, said method comprising the steps of:
  generating, using a hardware processor, a graph from token strings of bits or bytes that is characteristic of bits or bytes of plural malware, in which graph any token string of an entity of malware which overlaps at least in part a token string of another malware entity is joined thereto by a logic splice;
  performing run-time processing by passing said data stream through at least a portion of said graph while comparing the token string of the data stream with the graph to thereby identify a token string characteristic of a malware entity, and when found, flagging the presence of malware;
  wherein generating said graph from said database of token strings comprises creating a table of preamble entries, each preamble entry being associated with a plurality of pointers, wherein each of the plurality of pointers corresponds to a unique value of a data token, and setting at least one pointer of the plurality of pointers to a node containing a token value corresponding to its pointer.

15. A method for identifying the existence of malware in a data stream, said method comprising the steps of:
  acquiring a computer database of token strings, each of which token strings is a string of bits or bytes that is characteristic of bits or bytes of a particular malware in the data stream;
  preprocessing to generate a graph from said database of token strings of malware, in which graph portions of a token string of a given malware which correspond to portions of a token string of another malware are joined by a logic splice, so that at least some malware token strings are joined to other malware token strings by a least one splice;
  performing, using a hardware processor, run-time processing by passing said data stream through a portion of said graph while comparing the token string of the data stream with the graph to thereby (a) identify a token string of bits or bytes characteristic of bits or bytes of the given malware in the data stream and, when found, flagging the presence of said identified given malware, and (b) when a token string characteristic of said other malware is identified, routing said data stream over the associated splice to a further portion of said graph to continue said comparing; and
  responsive to the flagging of said given malware, taking action against said given malware;
  wherein generating said graph from said database of token strings of malware comprises creating a table of preamble entries, each preamble entry being associated with a plurality of pointers, wherein each of the plurality of pointers corresponds to a value of a data token, and setting at least one pointer of the plurality of pointers to a location of a node containing a token value that corresponds to the at least one pointer.

16. The method of claim 1, wherein each of the token strings is comprised of bits or bytes.

17. The system of claim 8, wherein each of the token strings is comprised of bits or bytes.

18. The method of claim 1, wherein said created node includes a plurality of pointers, each pointer having an index that corresponds to a possible value of a data token contained in one of the malware token strings.

* * * * *

UNITED STATES PATENT AND TRADEMARK OFFICE
CERTIFICATE OF CORRECTION

PATENT NO.        : 8,701,162 B1
APPLICATION NO.   : 12/917550
DATED             : April 15, 2014
INVENTOR(S)       : Richard N. Pedersen Page 1 of 1

It is certified that error appears in the above-identified patent and that said Letters Patent is hereby corrected as shown below:

In the Claims

Column 17, Line 5, Claim 12, the term "an other" before "malware", should read "another".

Signed and Sealed this
Twenty-fourth Day of June, 2014

Michelle K. Lee
*Deputy Director of the United States Patent and Trademark Office*